G. A. GOTCHALL.
LID REMOVER.
APPLICATION FILED MAY 2, 1907.
898,574.
Patented Sept. 15, 1908.
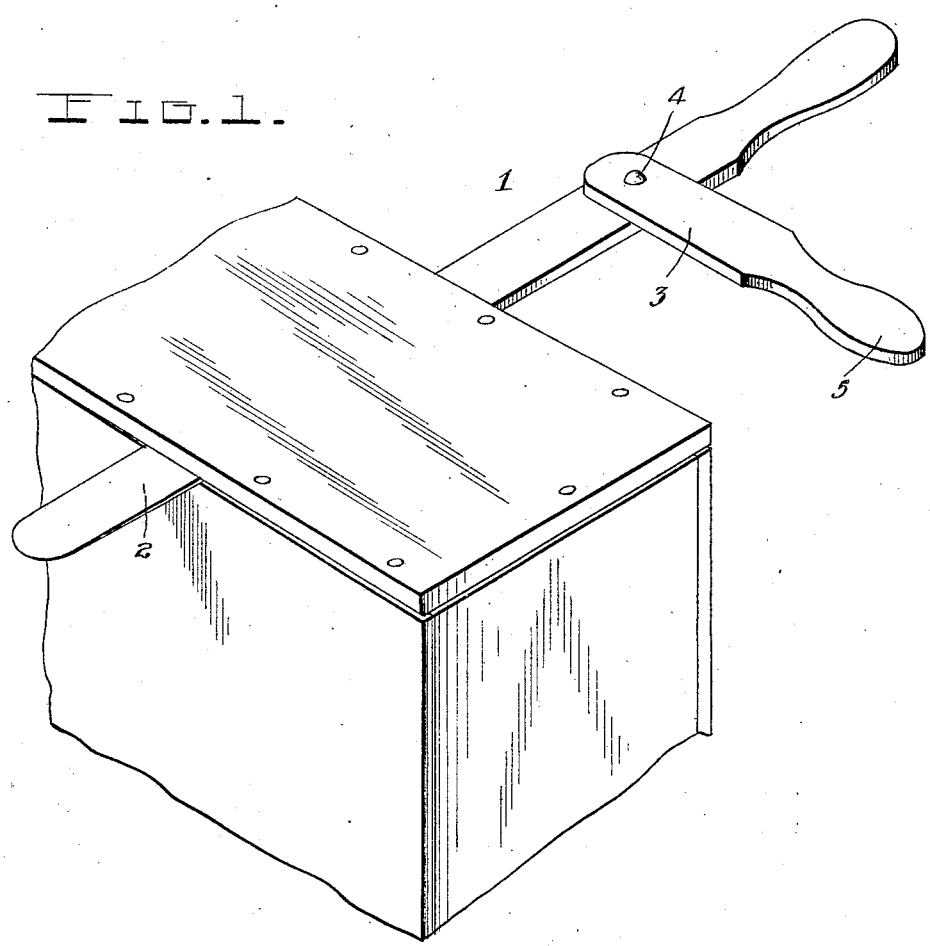
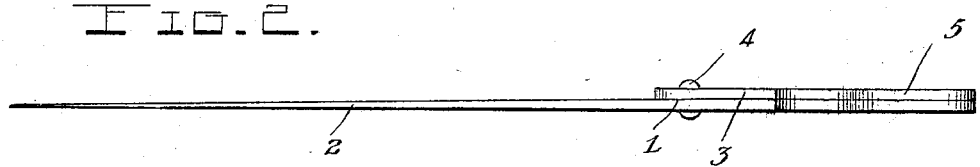
Witnesses
Chas. L. Griesbauer.
C. H. Griesbauer
Inventor
George A. Gotchall
by H. B. Willson & Co.
Attorneys

UNITED STATES PATENT OFFICE.

GEORGE A. GOTCHALL, OF MANNING, IOWA.

LID-REMOVER.

No. 898,574.　　　Specification of Letters Patent.　　　Patented Sept. 15, 1908.

Application filed May 2, 1907. Serial No. 371,465.

*To all whom it may concern:*

Be it known that I, GEORGE A. GOTCHALL, a citizen of the United States, residing at Manning, in the county of Carroll and State of Iowa, have invented certain new and useful Improvements in Lid-Removers; and I do declare the following to be a full, clear, and exact description of the invention, such as will enable others skilled in the art to which it appertains to make and use the same.

My invention has relation to new and useful improvements in lid removers, and while it is especially designed for removing egg case lids or covers, it may be advantageously employed to remove lids or covers from boxes or barrels of any description.

The object of my invention is to provide a simple, economical and novel device of this character by means of which covers of egg crates, cases, barrels or other receptacles may be removed in a convenient and expeditious manner.

With this and other objects in view, the invention consists of certain novel features of construction, combination and arrangement of parts, as will be more fully described and particularly pointed out in the appended claims.

In the accompanying drawings,—Figure 1 is a perspective view of my invention as applied; and Fig. 2 is an edge view.

Referring now more particularly to the drawings, the numeral 1 represents my improved lid remover, which essentially comprises two members, viz., an elongated opening blade 2 and a lever 3. Said opening blade is made of spring metal or other suitable material, and may be of any length, width or thickness found most convenient in the construction and application of the invention, but is of gradually increasing thickness from front to rear and provided at its rear end with a handle 2'. Said lever 3 is pivotally connected near its inner end by a rivet 4 or other equivalent means to the upper face and near the rear end of said opening blade, and terminates at its free or outer end in a suitable handle 5.

In the application of my invention, the forward end of the opening blade is inserted through and under the lid or cover of the egg case, or other receptacle, (see Fig. 1), and the lever is swung open and grasped by the operator for use in twisting the blade transversely to pry off the lid or cover.

Having described my invention, what I claim as new and desire to secure by Letters Patent, is:—

A box lid opener comprising a relatively wide straight flat blade of gradually increasing thickness from its front to its rear end and provided at its rear end with an integral handle, and a lever pivoted to the blade at a point near the rear handled end thereof, whereby the blade proper is wholly unobstructed through its entire length for proper entrance beneath the box lid, said lever being disposed to swing in the plane of the flat face of the blade and to a position transversely to the longitudinal axis of the latter and being designed when in the latter position for use in rotating the blade to pry off the box lid, said lever having an integral handle which, when the lever is in normal position, registers with and conforms to the outline of the blade handle.

In testimony whereof I have hereunto set my hand in presence of two subscribing witnesses.

GEORGE A. GOTCHALL.

Witnesses:
J. W. LASHELLE,
R. H. WHEELER.